United States Patent [19]

Nishihara et al.

[11] Patent Number: 5,029,466
[45] Date of Patent: Jul. 9, 1991

[54] SYSTEM FOR DETECTING ABNORMALITY OF STEERING ANGLE SENSOR

[75] Inventors: Takashi Nishihara; Makoto Sato; Hironobu Kiryu; Yukihisa Ishii, all of Saitama, Japan

[73] Assignee: Honda Giken Kogyo Kabushiki Kaisha, Tokyo, Japan

[21] Appl. No.: 551,987

[22] Filed: Jul. 12, 1990

[30] Foreign Application Priority Data

Jul. 13, 1989 [JP] Japan .................................. 1-181548

[51] Int. Cl.$^5$ ........................................... G01M 19/00
[52] U.S. Cl. .................................................. 73/118.1
[58] Field of Search ................ 73/118.1; 340/438, 443

[56] References Cited

U.S. PATENT DOCUMENTS 4,924,696 5/1990 Shroeder et al. ................... 73/118.1

Primary Examiner—Jerry W. Myracle
Attorney, Agent, or Firm—Armstrong, Nikaido, Marmelstein, Kubovcik & Murray

[57] ABSTRACT

A system for detecting the abnormality of a steering angle sensor comprises a steering angle sensor for detecting the steering angle of a wheel of a vehicle to be steered, a reference motional parameter determining apparatus for determining a reference value of a vehicle motional parameter on the basis of the steering angle, a motional parameter detector apparatus for detecting a vehicle motional parameter indicative of the same physical quantity as the reference motional parameter, and an abnormality judging apparatus for judging the abnormality of the steering angle sensor by use of the reference motional parameter and the vehicle motional parameter. It is possible to reliably and promptly detect the abnormality of the steering angle sensor. Further, abnormality judging conditions are stabilized by a delaying timer adapted to start the judgement by the abnormality judging apparatus at a given interval after satisfaction of the abnormality judging conditions, and this contributes to a further correct judgement.

7 Claims, 1 Drawing Sheet

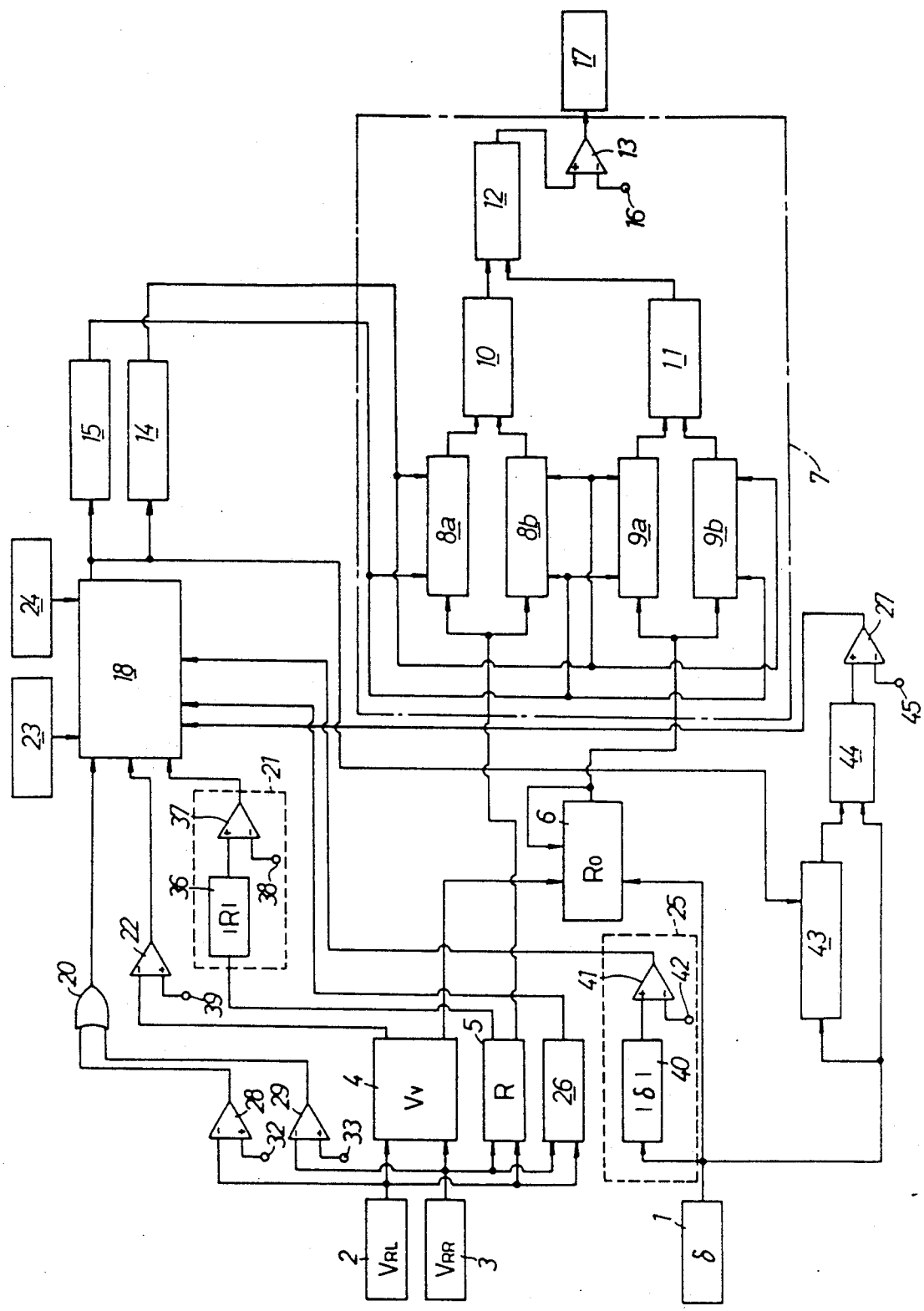

SYSTEM FOR DETECTING ABNORMALITY OF STEERING ANGLE SENSOR

BACKGROUND OF THE INVENTION

1 Field of the Invention

The field of the present invention is a system for detecting the abnormality of a steering angle sensor which is mounted in a vehicle to detect the steering angle of a steering wheel of the vehicle.

2 Description of the Prior Art

There are conventionally known such systems which are designed so that the steering angle is judged to be abnormal, if the steering angle is not varied more than a predetermined value during travelling of a vehicle, as disclosed in Japanese Patent Application Laid-open No. 200423/86.

In the above prior art system, however, the abnormality is necessarily not detected reliably, because the steering angle may be maintained constant in some cases during travelling of the vehicle. In addition, even if a timer is used to judge the continuation of the constant steering angle in order to ensure the judgement of the abnormality, the detection of the abnormality may be delayed by setting of such duration.

SUMMARY OF THE INVENTION

The present invention has been accomplished with such circumstances in view, and it is an object of the present invention to provide a system for detecting the abnormality of a steering angle sensor, wherein the abnormality of the steering angle sensor can be reliably and promptly detected.

According to a first aspect of the present invention, there is provided a system for detecting the abnormality of a steering angle sensor, comprising a steering angle sensor for detecting the steering angle of a wheel of a vehicle to be steered, a reference motional parameter determining means for determining a reference value of a vehicle motional parameter on the basis of the steering angle, a motional parameter detector means for detecting a vehicle motional parameter indicative of a physical quantity equal to that of the reference motional parameter, and an abnormality judging apparatus for judging the abnormality of the steering angle sensor by use of the reference motional parameter and the vehicle motional parameter.

With the above construction, the abnormality of the steering angle sensor is judged on the basis of a reference motional parameter provided in accordance with a steering angle signal from the steering angle sensor and a motional parameter indicative of the same physical quantity as the reference motional parameter. Therefore, it is possible to reliably and promptly detect the abnormality of the steering angle sensor.

According to a second aspect of the invention, there is provided a system for detecting the abnormality of a steering angle sensor, comprising a steering angle sensor for detecting the steering angle of a wheel of a vehicle to be steered, a motional parameter detector means for detecting a motional parameter indicative of a turning motion of the vehicle, an abnormality judging apparatus for judging the abnormality of the steering angle sensor by use of the steering angle and the motional parameter, and a delaying means for starting the judgement of the abnormality of the steering angle sensor by the abnormality judging apparatus at a predetermined interval after detection of the repose state of the steering angle, and continuing the execution of the judgement during continuation of the repose state.

With this construction, the abnormality of the steering angle sensor is judged by using the steering angle and the motional parameter and therefore, it is possible to reliably and promptly detect the abnormality of the steering angle sensor. In addition, the judgement of the abnormality of the steering angle sensor is conducted after the steering angle and the motional parameter have been stabilized and hence, it is possible to provide a correct judgement of the abnormality.

The above and other objects, features and advantages of the invention will become apparent from a reading of the following description of the preferred embodiment, taken in conjunction with the accompanying drawing.

BRIEF DESCRIPTION OF THE DRAWING

A drawing is a block diagram illustrating a construction of a system according to one embodiment of the present invention.

DESCRIPTION OF THE PREFERRED EMBODIMENT

The present invention will now be described with reference to the accompanying drawing by way of one embodiment in which the present invention is applied to a front engine and front drive vehicle. The abnormality of a steering angle sensor 1 for detecting the steering angle of a front wheel as a wheel to be steered is judged on the basis of an actual yaw rate R as a motional parameter provided on the basis of left and right rear wheel velocities $V_{RL}$ and $V_{RR}$ as left and right driven wheel velocities and of a reference yaw rate Ro as a reference motional parameter estimated from the steering angle $\delta$ detected by the steering angle sensor 1.

The left and right rear wheel velocities $V_{RL}$ and $V_{RR}$ are detected by left and right rear wheel velocity detectors 2 and 3, respectively. Detected values provided in the left and right rear wheel velocity detectors 2 and 3 are inputted to a vehicle velocity calculating means 4 and a yaw rate detector means 5 as a vehicle motional parameter detecting means, respectively. A calculated value provided in the vehicle velocity calculating means 4 is inputted to a reference yaw rate determining means 6 as a reference motional parameter determining means and further, a detected value in the steering angle sensor 1 is also inputted to the reference yaw rate determining means 6.

In the vehicle velocity calculating means 4, a vehicle velocity Vv is calculated according to the following expression (1):

$$V_v = (V_{RL} + V_{RR})/2 \qquad (1)$$

That is, the vehicle velocity Vv is provided in the form of an average value of the both rear wheel velocities $V_{RL}$ and $V_{RR}$.

In the yaw rate detecting means 5, the yaw rate R is calculated according to the following expression (2):

$$R = (V_{RL} - V_{RR}) \times d \qquad (2)$$

In the expression (2), the character d represents a tread width.

Further, in the reference yaw rate determining means 6, the reference yaw rate Ro is calculated on the basis of the vehicle velocity Vv and the steering angle $\delta$ detected by the steering angle sensor 1. That is, in the reference yaw rate determining means 6, the reference yaw rate Ro is obtained from a hysteresis of the reference yaw rate R detected by the yaw rate detector means 5 and a hysteresis of the steering angle δ obtained in the steering angle sensor 1, according to the following expression (3):

$$Ro = -a_1 \cdot Ro_{(n-1)} - a_2 \cdot Ro_{(n-2)} + b_1 \cdot \delta_{(n-1)} + b_2 \cdot \delta_{(n-2)} \quad (3)$$

wherein $a_1$, $a_2$, $b_1$, and $b_2$ are determined in accordance with the vehicle velocity Vv, and suffixes $n-1$ and $n-2$ represent a last value and a last but one value in a given cycle in which the above calculation is repeated.

The yaw rate R and the reference yaw rate Ro found in this manner are inputted to an abnormality judging means 7 where the abnormality of the steering angle sensor 1 is judged on the basis of such yaw rate R and reference yaw rate Ro.

The abnormality judging means 7 comprises a maximum value retaining circuit 8a for retaining the maximum value $R_{max}$ of the yaw rate R, a minimum value retaining circuit 8b for retaining the minimum value $R_{min}$ of the yaw rate R, a maximum value retaining circuit 9a for retaining the maximum value $R_{omax}$ of the reference yaw rate Ro, a minimum value retaining circuit 9b for retaining the minimum value $R_{omin}$ of the reference yaw rate Ro, a deviation calculating circuit 10 for calculating a difference between the maximum value $R_{max}$ and the minimum value $R_{min}$, a deviation calculating circuit 11 for calculating a difference between the maximum value $R_{omax}$ and the minimum value $R_{omin}$, a deviation calculating circuit 12 for calculating a deviation between outputs from the deviation calculating circuits 10 and 11, and a comparator circuit 13 adapted to produce a high level signal from the decision that the steering sensor 1 is abnormal, when the output from the deviation calculating circuit 12 has exceeded a preset value, e.g., 20°/sec.

The maximum value retaining circuit 8a and the mimimum value retaining circuit 8b are connected to the yaw rate detecting means 5 and retain the maximum value $R_{max}$ and the minimum value $R_{min}$ of the yaw rate R detected by the yaw rate detecting means 5, respectively. As a high level sample starting signal is received from the first timer 14, each of the retaining circuits 8a and 8b resets the value hitherto retained therein and starts its new retaining operation and carrys out its renewing operation for the retained value until a high level hold signal is received therein from the second timer 15.

In addition, the maximum value retaining circuit 9a and the minimum value retaining circuit 9b are connected to the reference yaw rate determining means 6 and retain the maximum value $R_{omax}$ and the minimum value $R_{omin}$ of the reference yaw rate Ro determined by the reference yaw rate determining means 6, respectively. As a high level sample starting signal is received from the first timer 14, each of the retaining circuits 9a and 9b resets the value hitherto retained therein and starts its new retaining operation and carrys out its renewing operation for the retained value until a high level hold signal is received therein from the second timer 15.

Outputs $R_{max}$ and $R_{min}$ from the maximum value retaining circuit 8a and the minimum value retaining circuit 8b are inputted to the deviation calculating circuit 10 where a deviation between the $R_{max}$ and $R_{min}$ is calculated. Also, outputs $R_{omax}$ and $R_{omin}$ from the maximum value retaining circuit 9a and the minimum value retaining circuit 9b are inputted to the deviation calculating circuit 11 where a deviation between the $R_{omax}$ and $R_{omin}$ is calculated. Further, outputs from the deviation calculating circuits 10 and 11 are inputted to the deviation calculating circuit 12 where a deviation between values obtained in the deviation calculating circuits 10 and 11 is calculated. An output from the deviation calculating circuit 12 is inputted to a non-inverted input terminal of the comparator circuit 13. On the other hand, a reference signal indicative of, for example, 20°/sec. is inputted from a reference terminal 16 to an inverted input terminal of the comparator circuit 13. Moreover, the comparator circuit 13 is connected to an alarm means 17 which is operated to inform the abnormality of the steering angle sensor 1 in reply to a high level signal received from the comparator circuit 13.

In the abnormality judging means 7 constructed in this manner, while the maximum value $R_{max}$ and the minimum value $R_{min}$ of the yaw rate R as well as the maximum value $R_{omax}$ and the minimum value $R_{omin}$ of the reference yaw rate Ro are retained moment by moment, deviations therebetween $(R_{max}-R_{min})$ and $(R_{omax}-R_{omin})$ are found, and a deviation $\{(R_{max}-R_{min})-(R_{omax}-R_{omin})\}$ is further found to judge whether or not the deviations $(R_{max}-R_{min})$ and $(R_{omax}-R_{omin})$ are different more than preset values. If the deviation $\{(R_{max}-R_{min})-(R_{omax}-R_{omin})\}$ does not exceed the reference value 20°/sec, then it is decided that the steering angle sensor 1 is normal, whereas if such deviation has exceeded the reference value, then it is decided that the steering angle sensor 1 is abnormal.

The reason why the yaw rate R and the reference yaw rate Ro are directly not compared and the abnormality is decided by the deviation $\{(R_{max}-R_{min})-(R_{omax}-R_{omin})\}$ in the above manner is that the abnormality of the steering angle sensor 1 may be misjudged due to an error in the steering angle sensor 1 and other sensors (for example, driven wheel velocity sensors) and an error in the calculation in the reference yaw rate determining means 6 for finding the reference yaw rate Ro. According to the present invention, in order to eliminate such error components of absolute values, the abnormality is judged on the basis of a difference between two yaw rate values R and a difference between two reference yaw rate values Ro.

The above-described first and second timers 14 and 15, which determine the retaining and renewing durations for the above-described maximum value retaining circuit 8a, minimum value retaining circuit 8b, maximum value retaining circuit 9a and minimum value retaining circuit 9b, are connected to a check-start judging circuit 18. The timer 14 produces a high level sample signal when a preset time T1, e.g., 0.5 second has been elapsed from the time point of reception of a higher level signal from the check-start judging circuit 18, while the second timer 15 produces a higher level hold signal when a preset time T2, e.g., 3.8 second has been elapsed from the time point of reception of a high level signal from the check-start judging circuit 18.

The check-start judging circuit 18 is arranged to start delivery of the high level signal when the following seven conditions (a) to (g) have been satisfied, and to stop the delivery of the higher level signal when even one of eight conditions (a) to (g) plus (h) has not been satisfied during delivery of the high level signal:

(a) All of the wheel velocity detectors are normal;

(b) The yaw rate R does not show a too large value which represents a pinning state of a vehicle;

(c) The vehicle velocity Vv is equal to or higher than 16 km/H;

(d) A brake pedal is not depressed;

(e) A parking brake is not applied;

(f) The angle of the wheel to be steered does not show a large steering angle which is substantially a lock angle;

(g) The vehicle is travelling on a flat road; and (h) The steering angle $\delta$ is not varied by 2° or more after the satisfaction of the above conditions (a) to (g).

In order to judge whether or not such conditioins (a) to (g) are satisfied, there are an OR circuit 20, a spin judging means 21, a comparator circuit 22, a brake switch 23, a parking brake switch 24, and a lock judging means 25, a bad road judging means 26 and a comparator circuit 27, which are connected to the check-start judging circuit 18.

Comparator circuit 28 and 29 are connected to an input terminal of the OR circuit 20, and the rear wheel velocities $V_{RL}$ and $V_{RR}$ are supplied from the left and right rear wheel velocity detectors 2 and 3 to inverted input terminals of the comparator circuit 28 and 29, respectively. On the other hand, reference terminals 32 and 33 are connected to non-inverted input terminals of the comparator circuits 28 and 29, respectively, so that signals corresponding to a vehicle velocity of 7 km/H are supplied from the reference terminals 32 and 33 to the non-inverted input terminals, respectively. Thus, if even one of the left and right wheel velocities is equal to or less than 7 km/H, a higher level signal is delivered from the OR circuit 20. The condition (c) is that the vehicle velocity Vv is equal to or higher than 16 km/H and hence, if an output from the OR circuit 20 is of a high level while the condition (c) is satisfied, at least one of the wheel velocity detectors 2 and 3 is abnormal.

In detecting the abnormality or the wheel velocity detectors 2 and 3 in this manner, if an abnormality or trouble occurs such as breaking or short-circuiting of even one of the detectors, the judging of the abnormality of the steering angel sensor 1 is prohibited at such a time, because it is impossible to perform correct calculations of both the vehicle velocity Vv and the yaw rate R.

The spin judging means 21 comprises an absolute value providing circuit 36 and a comparator circuit 37. The absolute value providing circuit 36 provides an absolute value $|R|$ of the yaw rate R received from the yaw rate detecting means 5, and the absolute value $|R|$ is inputted to a non-inverted input terminal of the comparator circuit 37. On the other hand, a signal corresponding to 50°/sec as a too large value indicative of the spinning state is inputted from a reference terminal 39 to an inverted input terminal of the comparator circuit 37, and an output signal from the comparator circuit 37 is applied to the check-start judging circuit 18. If the absolute value $|R|$ shows a value exceeding 50°/sec, a high level signal is applied from the comparator circuit 37 to the check-start judging circuit 18 from the decision that the yaw rate R shows the too large value.

When the vehicle is in the spinning state in this manner, a laterally slipping angle of the driven or rear wheel is too large, and the precision of calculation of the yaw rate R is reduced and therefore, the judgement of the abnormality of the steering angle sensor 1 is prohibited.

A signal indicative of the vehicle velocity Vv is supplied from the vehicle velocity calculating means 4 to an inverted input terminal of the comparator 22, and a signal corresponding to 16 km/H is supplied from the reference terminal 39 to a non-inverted input terminal of the comparator circuit 22. Thus, when the vehicle velocity Vv is equal to or lower than 16 km/H, a high level signal is supplied from the comparator circuit 22 to the check-start judging circuit 18.

High level signals are supplied from the brake switch 23 and the parking brake switch 24 to the check-start judging circuit 18, when a braking operation is being effected as well as when a parking brake is being applied.

This is to prohibit the judgement of the abnormality of the steering angle sensor 1, because when a brake or a parking brake is applied during travelling of the vehicle, the driven wheel velocities $V_{RL}$ and $V_{RR}$ are brought into their slipping states, resulting in an impossiblility to effect a correct calculation of the vehicle velocity Vv and a correct calculation of the yaw rate R.

The lock judging means 25 comprises an absolute value providing circuit 40 and a comparator circuit 41. The absolute value providing circuit 40 provides an absolute value $|\delta|$ of the steering angle $\delta$ received from the steering angle sensor 1, and the absolute value $|\delta|$ is supplied to a non-inverted input terminal of the comparator 41. On the other hand, a signal indicative of a lock angle is inputted from a reference terminal 42 to an inverted input terminal of the comparator circuit 41, and an output signal from the comparator circuit 41 is applied to the check-start judging circuit 18. When the absolute value $|\delta|$ shows a value exceeding the lock angle, a high level signal is supplied from the comparator circuit 41 to the check-start judging circuit 18 from the decision that the steering angle is large.

When the steering angle is large in this manner, the judgement of the abnormality is prohibited, because the yawing motion of the vehicle is in a non-linear region and it is feared that errors may be produced in the calculation of the yaw rate R and the determination of the reference yaw rate Ro.

The bad road judging means 26 is a means for judging the condition of a road surface from the result of filtration of the difference between the rear wheel velocities $V_{RL}$ and $V_{RR}$ by a band-pass filter and supplies a higher level signal to the check-start judging circuit 18 when it has decided that the vehicle is travelling on a bad road.

In this way, when the vehicle is travelling on a bad road, a signal error in yaw rate R and reference yaw rate Ro may be larger in some cases and hence the judgement of the abnormality is prohibited. An output from the check-start judging circuit 18 is also inputted to an initial value retaining circuit 43 which retains the steering angle $\delta$ received therein from the steering angle sensor 1 in response to reception of the high level signal from the check-start judging circuit 18. The steering angle $\delta$ retained in the initial value retaining circuit 43 is supplied to a deviation absolute value calculating circuit 44 which calculates an absolute value of a deviation between the steering angle $\delta$ retained in the initial value retaining circuit 43 when the high level signal has been delivered from the check-start judging circuit 18 and the steering angle $\delta$ detected in the steering angle sensor 1 while being varied moment by moment. An output from the deviation absolute value calculating circuit 44 is inputted to the non-inverted input terminal of the comparator circuit 27. A signal corresponding to 2° is supplied from a reference terminal 45 to the inverted input terminal 27. Thus, a high level signal is supplied from the comparator circuit 27 to the check-start judging circuit 18, when the steering angle δ has been varied in excess of 2° instead when the higher level signal has been outputted in response to satisfaction of the above-mentioned conditions (a) to (g) in the check-start judging circuit 18.

The reason why the judgement of the abnormality of the steering angle sensor 1 is prohibited when the steering angle δ has been varied in excess of 2° when or while any of the conditions (a) to (g) is unsatisfied is that the steering angle δ is not varied at the time of satisfaction of the conditions (a) to (g) if the steering angle sensor 1 has been abnormal, and the steering angle is scarcely varied in excess of 2° during cornering where a larger deviation $\{(R_{max}-R_{min})-(R_{omax}-R_{omin})\}$ is provided in the deviation calculating circuit 12.

The operation of this embodiment will be described below. A starting time suitable for judgement of the abnormality of the steering angle sensor 1 is judged in the check-start judging circuit 18, and within the period of time set by the first and second timers 14 and 15 on the basis of the result of the judgement the maximum value $R_{max}$ and minimum value $R_{min}$ of the yaw rate R as well as the maximum value $R_{omax}$ and minimum value $R_{omin}$ of the reference yaw rate Ro are retained moment by moment in the abnormality judging means 7, a deviation $\{(R_{max}-R_{min})-(R_{omax}-R_{omin})\}$ is calculated and judged whether or not it exceeds the reference value 20°/sec, thereby judging the abnormality of the steering angle sensor 1. When it is decided that the steering angle sensor 1 is abnormal, such abnormality is informed from the alarm means 17.

In this way, it is possible to reliably and promptly detect the abnormality of the steering angle sensor 1 by judging that the steering angle sensor 1 is abnormal, when the reference yaw rate Ro as a reference motional parameter given on the basis of the steering angle δ detected by the steering angle sensor 1 is greatly different from the yaw rate R as a motional parameter generated with steering of the steering wheel.

While the above embodiment has been described as using the yaw rate R as a motional parameter of the vehicle and the reference yaw rate as a reference motional parameter, it will be understood that a lateral acceleration of a vehicle may be used as a motional parameter and a reference lateral acceleration may be used as a reference motional parameter. In addition, the reference motional parameter has been calculated from the steering angle δ, and the abnormality has been detected using this calculated reference motional parameter and a motional parameter of the vehicle in the above embodiment, but in contrast with this, a reference value of a steering angle may be calculated from the motional parameter and compared with the detected steering angle. The judgement of the abnormality is on the assumption that the conditions (a) to (g) for the judgement of check starting have been satisfied, but all of them need not be used.

What is claimed is:

1. A system for detecting the abnormality of a steering angle sensor, comprising
 a steering angle sensor for detecting the steering angle of a wheel of a vehicle to be steered,
 a reference motional parameter determining means for determining a reference value of a vehicle motional parameter on the basis of said steering angle,
 a motional parameter detector means for detecting a vehicle motional parameter indicative of a physical quantity equal to that of said reference motional parameter, and
 an abnormality judging apparatus for judging the abnormality of said steering angle sensor by use of said reference motional parameter and said vehicle motional parameter.

2. A system for detecting the abnormality of a steering angle sensor according to claim 1, wherein said abnormality judging apparatus comprises a reference motional parameter deviation calculating means for calculating a deviation between maximum and minimum values of said reference motional parameter within a predetermined time, a vehicle motional parameter deviation calculating means for calculating a deviation between maximum and minimum values of said vehicle motional parameter within a predetermined time, and a comparator means adapted to produce a signal indicative of the steering angle sensor being abnormal, when a difference between the deviations obtained by said reference motional parameter and the vehicle motional parameter is equal to or larger than a predetermined value.

3. A system for detecting the abnormality of a steering angle sensor according to claim 1 or 2, further including a check-start judging apparatus operable to permit the abnormality judging apparatus to perform a judgment while operating conditions for said abnormality judging apparatus are satisfied, and a delaying timer operable to start a judgement operation of the abnormality judging apparatus at a predetermined interval from an instant when said check-start judging apparatus has decided that the operating conditions have been satisfied.

4. A system for detecting the abnormality of a steering angle sensor according to claim 3, wherein said check-start judging apparatus includes a first judging means for judging that at least said vehicle motional parameter is not too large, a second judging means for judging that said steering angle sensor shows a value equal to or less than a predetemined steering angle, and a travel judging means for judging that the vehicle is travelling, so that said check-start judging apparatus decides that the operating conditions are satisfied, when all of said judging means provide affirmative decisions.

5. A system for detecting the abnormality of a steering angle sensor according to claim 4, wherein said vehicle motional parameter is detected using a difference between velocities of left and right wheels of the vehicle, and said check-start judging apparatus further includes a wheel velocity sensor normality judging means for judging that each sensor for detecting each wheel velocity is normally operative, a brake judging means for judging that the wheel is in a nonbraked state, and a third judging means for judging that the vehicle is travelling on a good road, so that the checkstart judging apparatus decides that the operating conditions are satisfied, when all of said judging means provide affirmative decisions.

6. A system for detecting the abnormality of a steering angle sensor according to claim 5, wherein said check-start judging apparatus further includes a steering angle repose-state judging apparatus for judging that the steering angle detected by the steering angle sensor is substantially constant, after a decision that all of said judging means provide affirmative decisions.

7. A system for detecting the abnormality of a steering angle sensor, comprising
    a steering angle sensor for detecting the steering angle of a wheel of a vehicle to be steered,
    a motional parameter detector means for detecting a motional parameter indicative of a turning motion of the vehicle,
    an abnormality judging apparatus for judging the abnormality of the steering angle sensor by use of said steering angle and said motional parameter, and
    a delaying means for starting the judgement of the abnormality of the steering angle sensor by said abnormality judging apparatus at a predetermined interval after detection of the repose state of said steering angle, and continuing the execution of the judgement during continuation of the repose state.

* * * * *